(12) United States Patent
Shimirak

(10) Patent No.: US 7,765,695 B2
(45) Date of Patent: Aug. 3, 2010

(54) METHOD AND PROCESS FOR MANUFACTURING A TERMINAL BLOCK

(75) Inventor: Gerald L. Shimirak, Sedalia, CO (US)

(73) Assignee: Channell Commercial Corporation, Temecula, CA (US)

( * ) Notice: Subject to any disclaimer, the term of this patent is extended or adjusted under 35 U.S.C. 154(b) by 0 days.

(21) Appl. No.: 11/807,774

(22) Filed: May 29, 2007

(65) Prior Publication Data

US 2008/0295330 A1 Dec. 4, 2008

(51) Int. Cl.
*H01R 43/00* (2006.01)
(52) U.S. Cl. .............................. 29/858; 29/861; 29/863; 29/866; 174/36; 174/38; 174/74 R; 174/76; 174/87
(58) Field of Classification Search .................. 29/858, 29/861, 863, 866, 867; 174/36, 38, 76, 74 R, 174/87; 439/201, 411, 417, 597
See application file for complete search history.

(56) References Cited

U.S. PATENT DOCUMENTS

| | | | | |
|---|---|---|---|---|
| 4,314,092 | A | * | 2/1982 | Fleming et al. ............... 174/38 |
| 4,725,243 | A | | 2/1988 | Pretchel et al. |
| 5,112,245 | A | | 5/1992 | Shimirak et al. |
| 5,153,988 | A | * | 10/1992 | Mattis et al. .................. 29/863 |
| 5,399,100 | A | | 3/1995 | Dooley et al. |
| 6,015,312 | A | | 1/2000 | Escane |
| 6,193,556 | B1 | | 2/2001 | Escane |
| 6,196,862 | B1 | | 3/2001 | Dooley |
| 6,370,771 | B1 | | 4/2002 | Huang |
| 6,457,990 | B1 | | 10/2002 | Daoud |
| 6,672,893 | B1 | * | 1/2004 | Sedlecky et al. ............. 439/417 |
| 2006/0099846 | A1 | * | 5/2006 | Channell et al. ............. 439/411 |

FOREIGN PATENT DOCUMENTS

| | | |
|---|---|---|
| EP | 327330 A2 | 8/1989 |
| GB | 2102635 A | 2/1983 |
| GB | 2129630 A | 5/1983 |
| GB | 2176062 A | 12/1986 |
| GB | 2260036 A | 3/1993 |
| GB | 226773 A | 5/1993 |
| GB | 2287367 A | 9/1995 |
| GB | 2293699 A | 4/1996 |
| GB | 2303500 A | 2/1997 |
| GB | 2320144 A | 6/1998 |

OTHER PUBLICATIONS

International Search Report issued Aug. 11, 2008 in PCT/US2008/065164.

* cited by examiner

*Primary Examiner*—Thiem Phan
(74) *Attorney, Agent, or Firm*—Buchanan Ingersoll & Rooney PC

(57) ABSTRACT

A method of manufacturing a terminal block for a telecommunication cable comprising the steps of providing a preformed substrate member comprising a podium member, at least one electrical connector and at least one insulated electrical wire attached to an electrical contact positioned within the at least one electrical connector; placing the preformed substrate member in a mold; and injecting a dielectric material into the mold containing the podium member to form an overmolded terminal block, wherein the dielectric material covers the at least one insulated electrical wire and a portion of the electrical contact positioned within the at least one electrical connector.

18 Claims, 12 Drawing Sheets

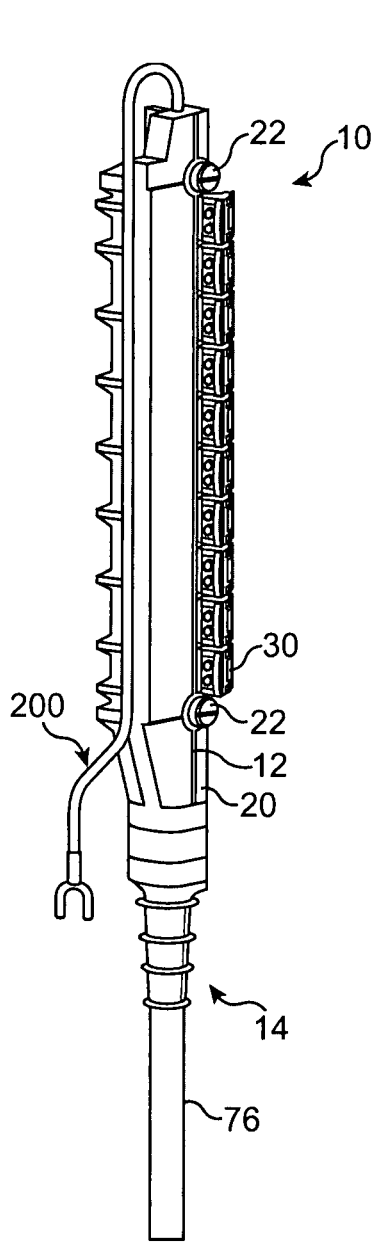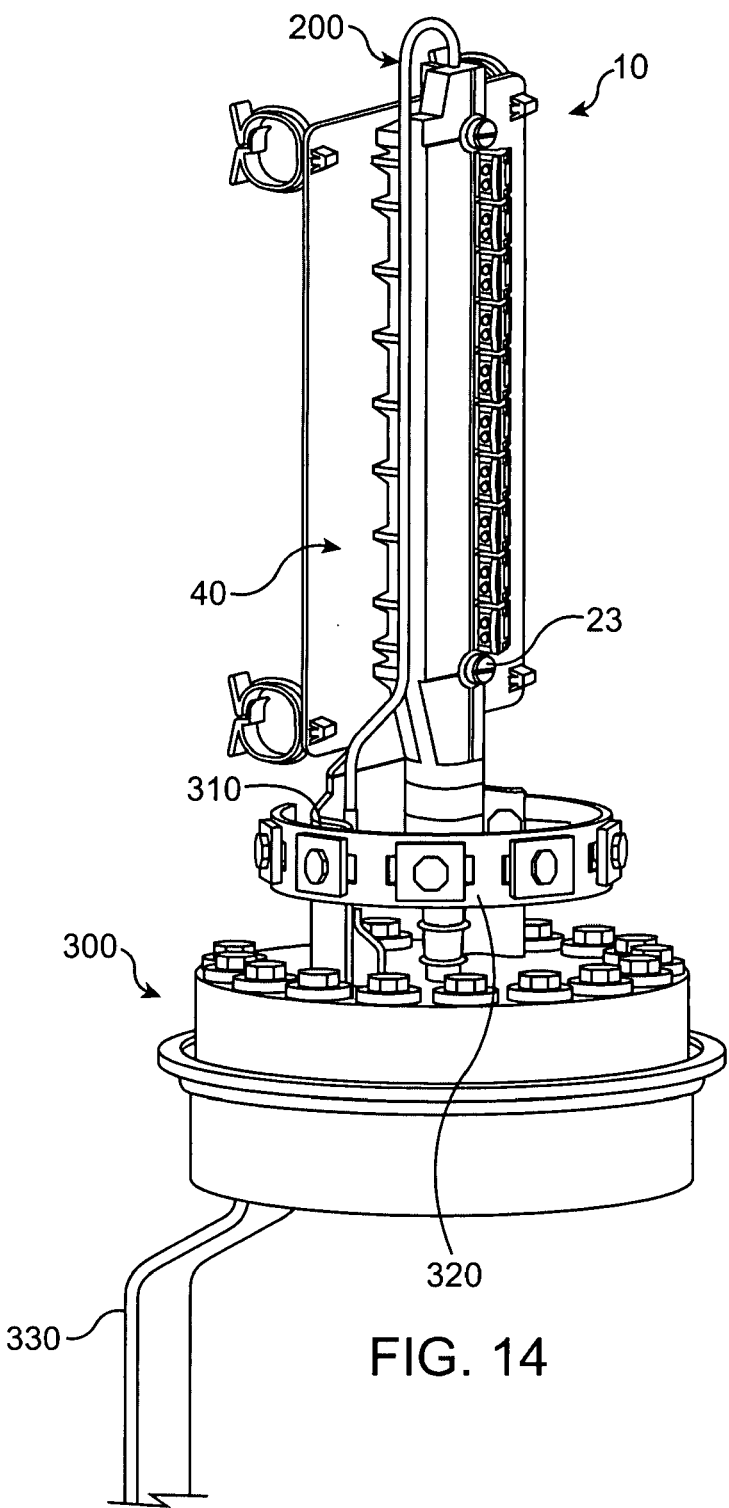
FIG. 13
FIG. 14

METHOD AND PROCESS FOR MANUFACTURING A TERMINAL BLOCK

FIELD OF THE INVENTION

This invention relates to method and process of overmolding an electrical block, and more particularly terminal blocks for use in the telecommunications industry and a method and process for manufacturing such terminal blocks.

BACKGROUND OF INVENTION

Terminal blocks are typically used in the telecommunications industry to connect multiple wire pairs, for example, to connect telephone service wires to telephone company distribution cables. Such terminal blocks typically connect from 2 to 50 individual service wire pairs to the distribution cable that may have several thousand-wire pairs. Generally, the terminal block is spliced to the distribution cable through a splicing cable or stub cable that forms part of the terminal block. The customer service wires are then connected to the terminal blocks through some type of terminal, which, ideally, enables the service wires to be easily connected, disconnected and reconnected on site.

In the telecommunications industry, a large number of wires connect the various component of the system through the terminal block. To organize the many wires, some telecommunications operators use color-coding on the wire jackets based on signal type, and channel number or program content.

Typically, telephone-wiring applications use a uniform scheme for dealing with a large number of wires for the telephone industry. The scheme uses two color codes—one for large numbers of wires organized in pairs and the other for smaller numbers of wires that also can be organized in pairs. For large number of wires, each pair is assigned a two-color code. The colors are selected from two groups of five, resulting in what is called a binder-group of 25 pairs. The colors used for a group are white, red, black, yellow and violet. The colors used for "pairs within a group" are blue, orange, green, brown and slate. Each pair must have a unique color combination. One wire within each pair has a solid background of its group color and stripes of the "pair within the group" color; the second wire has the colors reversed. Cables with more than 25 pairs of wires are constructed from 25-pair groups.

For small wiring groups, such as wires for an individual telephone station or terminal, a second color-code scheme can be used. The alternate color uses the first three pairs of the standard color code (white-blue, blue-white, and so on) or alternatively can use the six alternate color wires.

Originally, telecommunications terminals were optimized for use with copper drop wires. Through an evolutionary process, a plurality of different wire sizes and kinds of wire have been employed to connect the subscriber to the phone company. The gauges can vary from 18½ to 26 AWG (American Wire Gauge) gauge copper based wires some of which may have steel cores. Most common copper wires are between about 19-24 AWG gauge.

Traditionally, standard conventional terminals had an electrical connector secured in a suitable dielectric base material. The wires are stripped of their insulation, formed in a "C" shape, and connected to the electrical connector. After connecting the wires to the electrical connectors, a potting material is poured by hand over the electrical connectors and electrical wires.

The potting by hand of an electrical terminal block is typically performed by mixing a liquid potting compound or gel. The liquid potting compound is applied over the connection between the electrical contacts and the electrical wires, which forms the electrical circuit. The gel cures and solidifies the components into a solid mass, which protects the electrical circuit from moisture, dust, contaminants, vibrations and impact damage. The potting process provides environmental and mechanical protection for the connections in the terminal blocks. The process, however, is craft sensitive and time consuming.

Alternatively, the terminal block can be manufactured using insulation displacement contacts (IDC) or terminals, which cut through the wire insulation without requiring wire stripping. Although, the IDC partially addresses the time consuming installation problems, the process is still not only labor intensive but is also very time consuming. In addition, the IDC terminals require hand installation of the individual termination of the copper wires within the cable to the back of the terminal by hand and thereafter potting by hand.

Accordingly, there is a need for improvements including increased efficiency and increased flexibility over the handmade products made by labor intensive manufacturing processes that can be used for the production of an overmolded terminal block for telecommunication cables, which eliminates the wrapping of wires by hand around the electrical connectors, and the hand poured gravity potting process. In addition, it would be desirable to have a method and process for manufacturing an overmolded terminal block, which allows for the use of dielectric materials that cannot be used with traditional potting compounds used in the hand poured gravity potting process.

SUMMARY OF THE INVENTION

This invention provides new and improved manufacturing method and process for the manufacturing and/or production of an overmolded electrical block including terminal blocks for the telecommunications industry.

In one aspect of the invention, a method of manufacturing a terminal block for a telecommunication cable comprises: providing a preformed substrate member comprising a podium member, at least one electrical connector and at least one insulated electrical wire attached to an electrical contact positioned within the at least one electrical connector; placing the preformed substrate member in a mold; and injecting a dielectric material into the mold containing the podium member to form an overmolded terminal block, wherein the dielectric material covers the at least one insulated electrical wire and a portion of the electrical contact positioned within the at least one electrical connector.

In a further aspect of the invention, a method of manufacturing a terminal block for a telecommunication cable comprises: providing a podium member having a front side and a back side and adapted for receiving the end of a cable, the cable comprising a plurality of multiple pairs of insulated electrical wires; placing a plurality of electrical connectors in the housing such that one end of the connector is in the front side of the housing and one end of the housing is in the back side of the housing; connecting the plurality of multiple pairs of insulated electrical wires to the plurality of electrical connectors in the back side of the housing; attaching a bond clamp to the cable; attaching the bond clamp to the podium member; and overmolding a dielectric material into the back side of the housing to encapsulate the connections of the wires and the podium member.

In another aspect of the invention, a method of manufacturing a terminal block for a telecommunication cable comprises: providing a preformed substrate member comprising a podium member, at least one electrical connector and at least one insulated electrical wire attached to one end of an electrical contact positioned within each of the at least one electrical connectors; placing the substrate member in a mold; and injecting a dielectric material by a force of greater than 1 g into the mold containing the at least one electrical connector and the at least one electrical wire, wherein the dielectric material surrounds at least the first end of the electrical connector and the at least one electrical wire.

The above aspects of this invention are more fully explained in reference to the drawings and general disclosure herein.

BRIEF DESCRIPTION OF THE DRAWINGS

The invention will now be described in greater detail with reference to the preferred embodiments illustrated in the accompanying drawings, in which like elements bear like reference numerals, and wherein:

FIG. 13 is a perspective view of an overmolded terminal block in accordance with one embodiment.

FIG. 14 is a perspective view of an overmolded terminal block and a bracket mounted terminal (BMT) in accordance with another embodiment.

DESCRIPTION OF THE INVENTION

With reference to the drawings, the method and process for manufacturing a terminal block for a telecommunication cable according to the present invention will now be described.

Although the traditionally manufactured electrical blocks including terminal blocks incorporating a potting compound is functional, it would be desirable to have a manufacturing process and system for manufacturing an overmolded terminal block for a telecommunication cable that is not labor intensive and does not require hand poured potting of the terminal block.

In accordance with one embodiment, a method of manufacturing an electrical enclosure for use in a harsh environment, particularly telecommunications is to overmold a preformed substrate or assembly, which includes a plurality of electrical contacts and electrical wires attached thereto, generally referred to as terminals, with one of any number of engineering resins, thus producing an electrical enclosure with an integral electrical connector. Typically, the overmolding process combines plastics with materials like rubber to form a completed part in the form of an electrical connector or terminal block.

In accordance with another embodiment, a pre-formed substrate member or assembly is placed into a mold, and an overmold material is then injected into the mold. In accordance with one embodiment, the overmold material covers a portion of the pre-formed substrate member or assembly and does not cover the portion of the terminal block, which can include a prefabricated re-enterable electrical connector.

Figure 1:
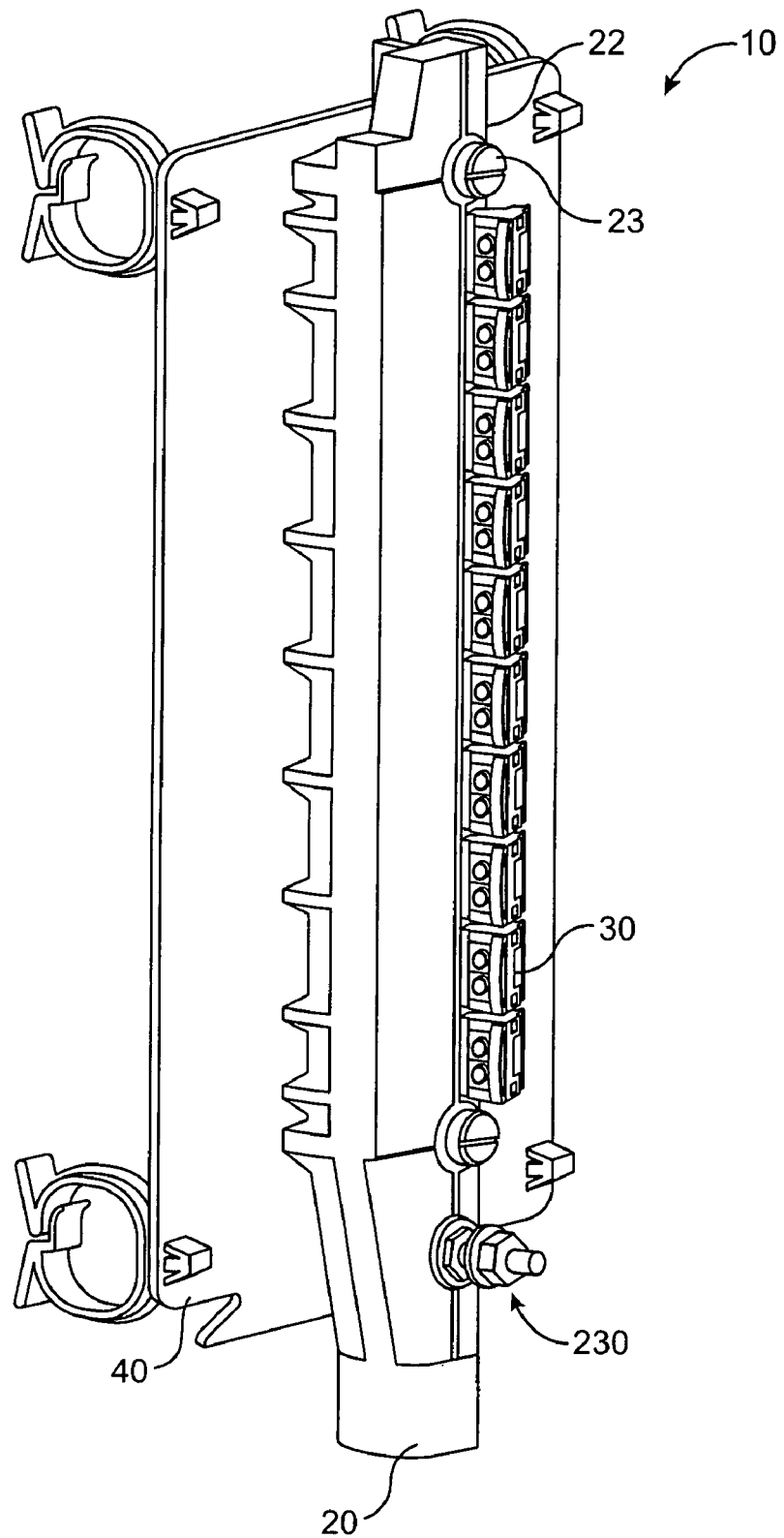
FIG. 1 is a perspective view of an overmolded terminal block in accordance with one embodiment.

FIG. 1 shows a perspective view of an overmolded terminal block 10 in accordance with one embodiment. The overmolded terminal block 10 includes an overmolded portion 20 and a re-enterable electrical connector 30. The terminal block 10 also preferably includes at least two opening or threaded holes 22 configured to receive a screw or other suitable fastener 23 for securing the terminal block 10 to a support member 40. For example, as shown in FIG. 1, the terminal block 10 can optionally be attached to a support member 40 in the form of a backing member having a plurality of fasteners 42 attached thereto.

The re-enterable electrical connector 30 is preferably comprised of a pair of wire receiving passages 84 (FIGS. 15A and 15B) movable between a first position in which a pair of electrical wires 70 is held apart from an end 38 (FIG. 4) of a contact member 32 contained within the electrical connector 30, and a second position in which the pair of electrical wires 70 is inserted into the end 38 of the contact member 32. It can be appreciated that the electrical connector 30 can be any suitable electrical connector for use in the telecommunications industry and is not limited to the re-enterable electrical connector 30 as shown in the attached FIGS. 15A and 15B.

Figure 2:
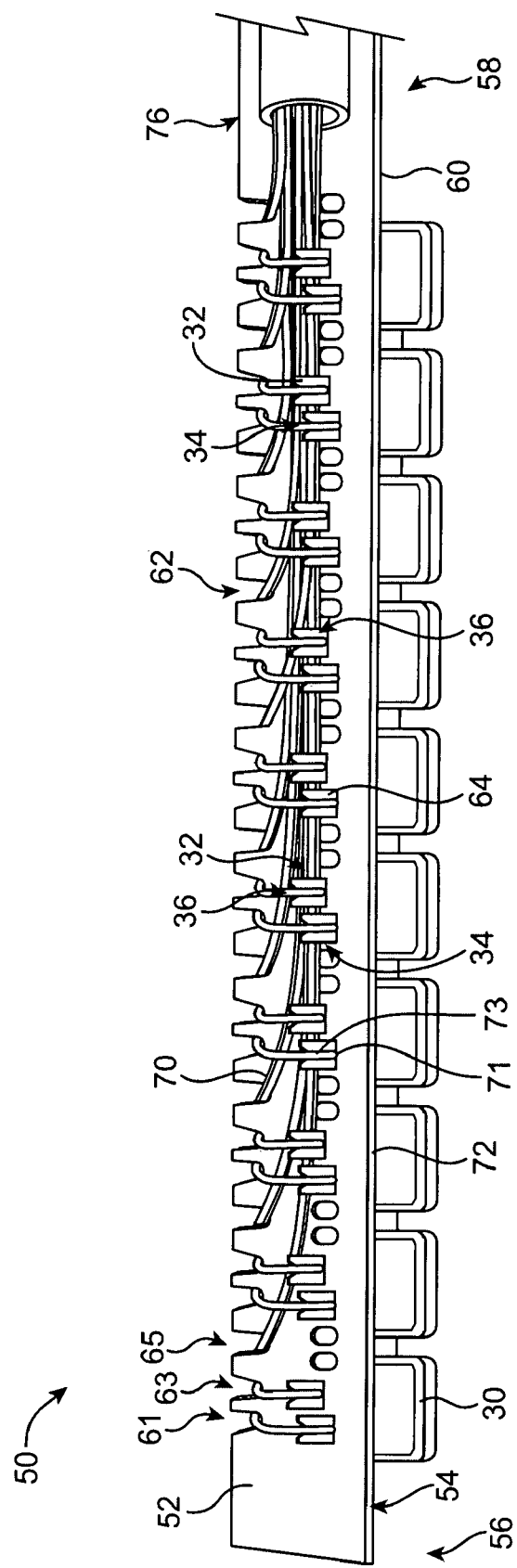
FIG. 2 is a perspective view of a pre-formed substrate member or assembly for an overmolded terminal block as shown in FIG. 1 in accordance with one embodiment.

FIG. 2 shows a perspective view of a pre-formed substrate member or assembly 50 for an overmolded terminal block 10. The pre-formed substrate member or assembly 50 includes a pre-formed platform or podium member 60 having a plurality of wire receiving slots 62 and a plurality of electrical connector slots 64. It can be appreciated that the pre-formed platform or podium member 60 is preferably comprised of a suitable material, including plastics and polymer materials, which are able to withstand the temperature of the injected dielectric material, which forms the overmold portion of the terminal block 10.

Figure 15A:
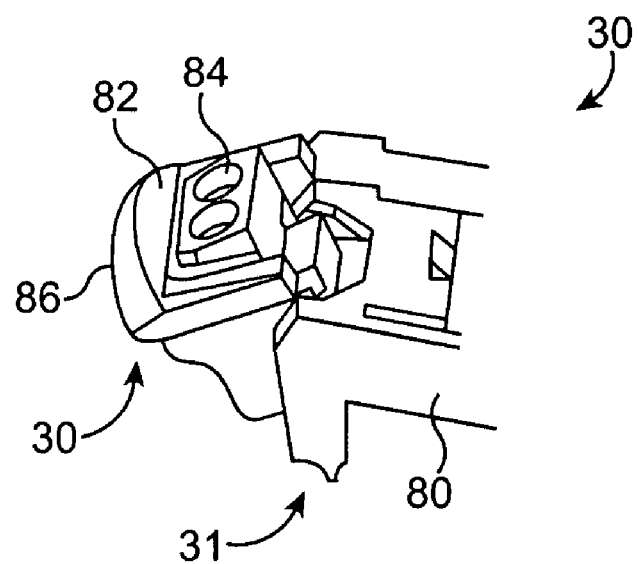
FIGS. 15A and 15B are perspective views of an electrical connector in accordance with another embodiment.
Figure 15B:
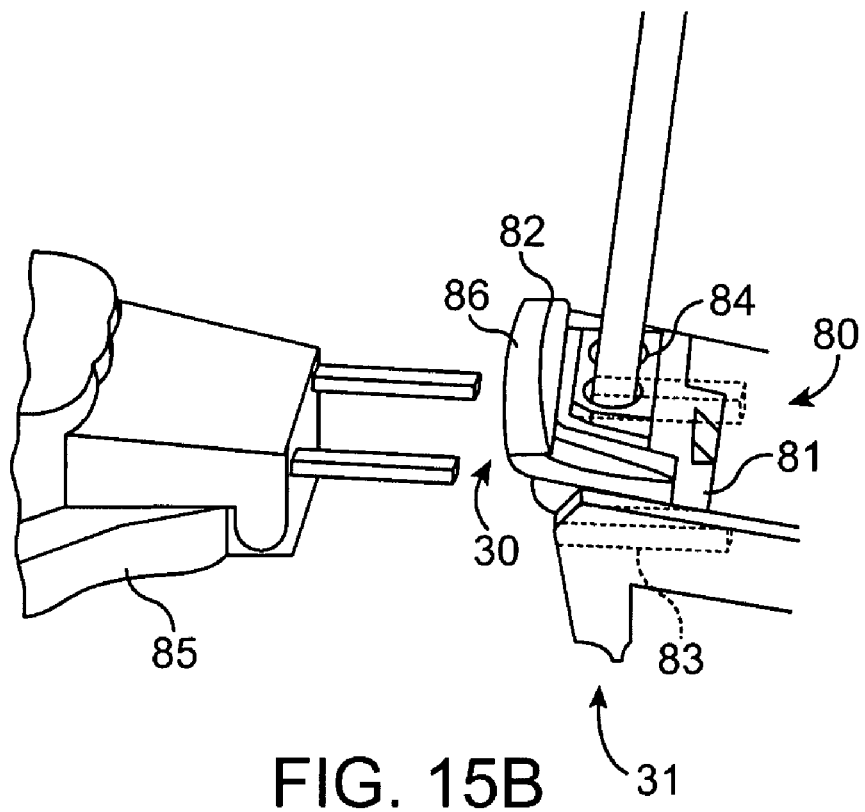

As shown in FIG. 2, the pre-formed substrate member or assembly 50 has a back side (or first side) 52 and a front side (or second side) 54. The front side 54 of the podium member 60 is configured to receive a pre-fabricated re-enterable electrical connector 30 as shown in FIGS. 15A and 15B. The electrical contacts 32 of the re-enterable connector 30 are placed through the plurality of electrical connector slots 64 extending from the front side 54 to the back side 52, such that the exposed end 34 of the electrical contact 32 is exposed on the back side 52 and adapted to receive an insulated electrical wire 70.

As shown in FIG. 2, the back side 52 of the podium member 60 is configured to receive the plurality of electrical wires 70 and an exposed end 34 of the electrical contact 32 contained within the electrical connector 30. The pre-formed substrate member or assembly 50 also includes a pair of outer edges 67, 69, which extend between a distal end 56 and a proximal end 58 of the podium member 60. In accordance with one embodiment, the plurality of electrical wires 70 are gathered at the proximal end 58 of the podium member 60 and forms a "pigtail" as known in the telecommunication industry.

The podium member 60 is preferably a plastic type material or other suitable material and can be configured in any suitable shape and/or configuration to receive an electrical contact 32 in the form of a prefabricated re-enterable electrical connector 30. In accordance with one preferred embodiment, the podium member 60 is manufactured from recyclable materials.

Each of the insulated electrical wires 70 preferably include an outer jacket 73 of electrical insulation surrounding an electrically conductive wire 71. The electrically conductive wire 71 is preferably a copper wire, steel wire with a copper coating, or the like wherein the wire has electrically conductive properties. For example, the electrical wire 71 can be a 19 AWG (American Wire Gauge) to a 26 AWG gauge wire, and more preferably a 22 AWG to a 24 AWG gauge wire. Alternatively, the electrical wires 71 can be Category 3, 5 or 6 wires/cables used in the transmission of broadband signals. The outer jacket 73 of electrical insulation is preferably a plastic such as polyvinyl chloride (PVC) or a similar type of insulation material. If desired, the insulation material can be a paper or pulp like material.

The plurality of wire receiving slots (or grooves) 62 are preferably positioned on one of the outer edges 67 of the podium member 60 between the distal and proximal ends 56, 58. As shown in FIG. 2, the outer edge 67 includes a plurality of wire receiving grooves or slots 62, which generally forms a jagged or saw tooth edge. The plurality of wire receiving grooves or slots 62 assist with the wiring of the insulated electrical wires 70 to the electrical contact 32 (FIG. 4) on a first or exposed end 34 of the electrical connector 30. In accordance with a preferred embodiment, the first or exposed end 34 of the electrical connector 30 is an insulation displacement contact or connector (IDC) 36, which pierces the insulation 73 on the insulated electrical wire 70 to make the connection, removing the need to strip the wire 70 before establishing an electrical connection between the wire 70 and the electrical connector 30.

The plurality of wire receiving slots 62 are preferably arranged in groups of three comprised of a first 61 and a second 63 wire receiving slot, which are configured to receive one wire each of a pair of insulated electrical wires 70, which are attached to the electrical contact 32. A third wire receiving slot 65 is configured to receive the pair of electrical wires 70 from the first and second wire receiving slots 61, 63 and guide the pair of wires 70 towards the proximal end 58 of the podium member 60. The plurality of electrical wires 70 preferably extend from the distal end 56 of the podium member 60 to the proximal end 58, wherein the plurality of electrical wires 70 are gathered together to form the "pigtail".

The plurality of electrical connector slots 64 are positioned within the podium member 60 and are configured to receive the exposed ends 34 of the electrical contact 32 having an insulation displacement contact (IDC) 36. The plurality of electrical connector slots 64 are preferably in pairs, which are configured to receive the pair of exposed ends 34 of the electrical connector 30. In accordance with one embodiment, the electrical connector slots 64 may be slightly offset to accommodate the exposed ends 34 of the electrical connector 30. In addition, to assist with the overmolding process, the podium member 60 can also include a plurality of holes or openings 55 positioned between the electrical connector slots 64. In accordance with one embodiment, the pair of exposed ends 34 having an insulation displacement contact (IDC) 36 receives a pair of insulated electrical wires 70, which are color codes for telecommunication use.

In one embodiment, the insulated electrical wires 70 comprise a pair of twisted copper wires 71 that are commonly used in the telephone industry. The pairs of copper insulated wires 71 are typically found in groups of between 5 and 50 pairs, depending on the particular context in which they are to be used. Preferably, the pairs of insulated electrical wires 71 are found in groups of 25 or less, and more preferably increments of 5, i.e. 5, 10, 15, 20, and 25, with groups of 25 being one of the most preferred embodiments.

As shown in FIG. 2, the electrical wires 70 are preferably attached to the IDC connectors 36 of the electrical contacts 32 and/or electrical connectors 30 starting at the distal end 56 of the podium member 60 and working towards the proximal end 58. In accordance with one embodiment, the insulated electrical wires 70 are pairs of twisted copper wires 71 that are commonly used in the telephone industry. The first pair of wires 70 are attached or placed within the IDC contact 36, wherein the outer jacket 73 is removed, which provides an electrical connection between the electrical contact 32 and the electrical wire 70. The electrical wires 70 are then placed in the first and second wire receiving slots 61, 63, then fed through the third wire receiving slot 65, and gathered at the proximal end 58. The wiring of the podium member 60 continues with the next electrical connector 30 or electrical contact 32, wherein the next pair of insulated electrical wires 70 extend over the first pair of insulated electrical wires 70. The wiring of the podium member 60 continues until the electrical wiring of the electrical connectors 30 with insulated electrical wires 70 has been completed for each of the electrical connectors 30 and/or electrical contacts 32.

In accordance with another embodiment, a bond clamp 230 (FIGS. 11A-11C) is preferably used to assist with the manufacturing of the terminal block 10. The bond clamp 230 is preferably secured to the podium member 60 with a suitable fastener, and provides protection to the electrical contacts 32 and the electrical wiring 70 during the molding process.

During the molding process, in accordance with one embodiment, the electrical contact 32 of the electrical connector 30 is robotically positioned within the plurality of grooves or slots 64. At least one robotic device places the exposed end 34 of the electrical contact 32 through the slot or opening 64 of the podium member 60. The plurality of electrical wires 70 are then placed on the exposed end 34 of the electrical contact 32, wherein the insulation displacement contact (IDC) removes the outer jacket 73 (i.e., insulation or protective layer) from the electrical wire 71 and forms an electrical contact between the electrical connector 30 and the electrical wires 70. The insulated electrical wires 70 are preferably fed from a plurality of spools of insulated electrical wires 70, wherein each of the insulated electrical wires 70 have a color-coded outer jacket.

In accordance with one embodiment, a robotic apparatus connects the multiple pairs of insulated electrical wires 70 to the multiple pairs of electrical connectors 30 starting with the electrical wiring of the pair of IDC contacts 36 at the distal end 56 of the podium member 60 and working towards the proximal end 58. In an alternative embodiment, the wiring of the preformed platform or assembly 50 can be performed manually (i.e., by hand).

Figure 3:
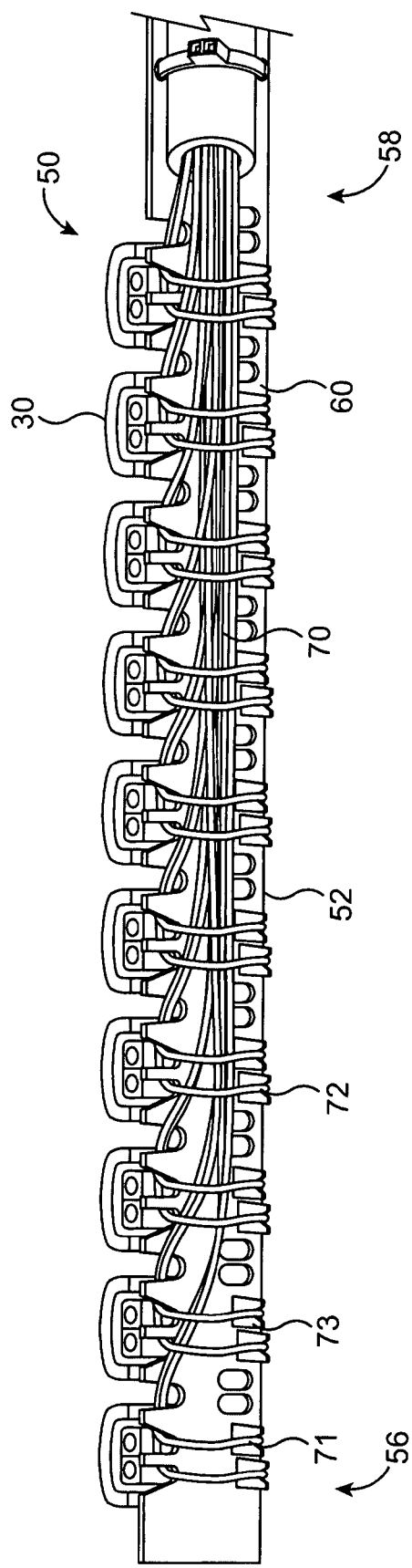
FIG. 3 is a perspective view of the pre-formed substrate member or assembly for an overmolded block as shown in FIG. 1 in accordance with another embodiment.

As shown in FIG. 3, the electrical connector 30 is inserted or positioned within the podium member 60 and the plurality of insulated electrical wires 70 having an electrical wire 71 and an insulated outer jacket 73 are inserted through the exposed end 34 of the electrical contact 32 and then wrapped around the plurality of slots or grooves 62 on the edge of the podium member 60. The exposed end 34 of the electrical contact 32 in the form of an IDC serves as a means to cut the electrical wire 70 during wiring of the podium member 60.

As shown, the insulated electrical wires 70 are wrapped around the slot or groove 61, 63 and extend along a back side 52 of the podium member 60 to be gathered with other electrical wires 70 to form the pigtail. It can be appreciated that the exposed end 34 can be an insulation displacement contact (IDC) or any other suitable device, which can cut or sever the electrical insulation of the insulated electrical wire 70.

Figure 4:
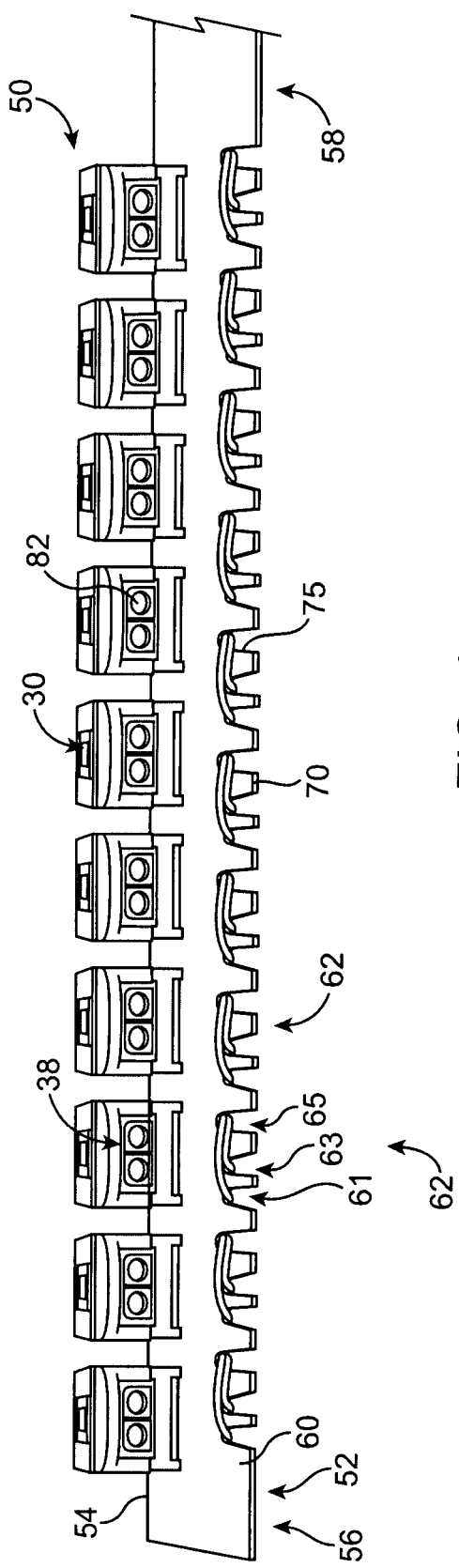
FIG. 4 is a perspective view of the pre-formed substrate member or assembly for an overmolded terminal block as shown in FIG. 1 in accordance with a further embodiment.

FIG. 4 shows the pre-formed substrate member 50 in accordance with another embodiment. As shown in FIG. 4, the preformed substrate member 50 includes a podium member 60 having a plurality of electrical connector 30 and a plurality of insulated electrical wires 70 attached thereto. The electrical connector 30 preferably is a multi-use or re-enterable electrical connector having a pair of wire receiving passages 82 movable between a first position in which a pair of wires are held apart from the second end of the electrical contact 32, and a second position in which the pair of wires are inserted into the second end. For example, the electrical connector 30 can be a MINI-ROCKER® switch as manufactured and sold by Channell Commercial Corporation, Temecula, Calif., which allows the electrical connector 30 to be a multiple use assembly, rather than a single use assembly.

Figure 5:
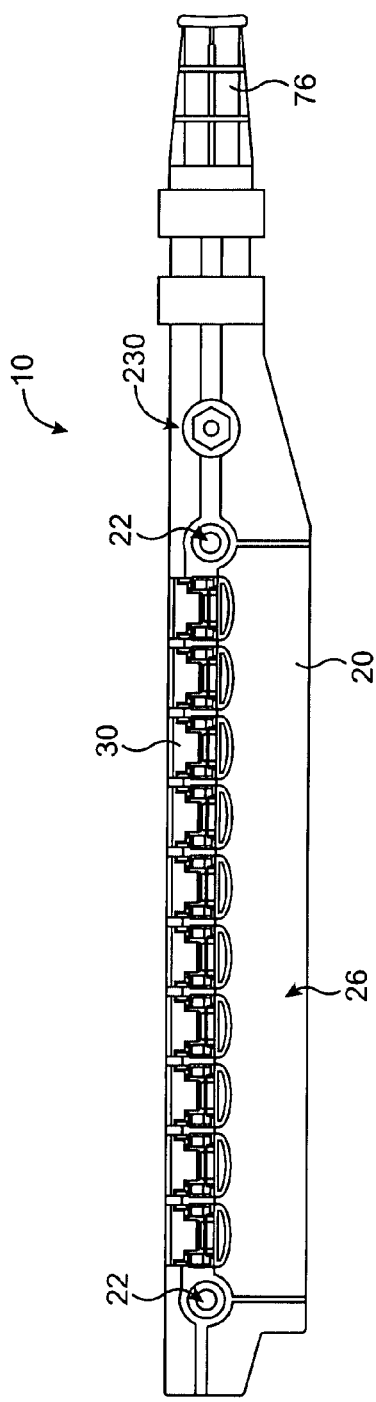
FIG. 5 is a top view of an overmolded terminal block in accordance with one embodiment.

FIG. 5 shows a top view of an overmolded terminal block 10 in accordance with one embodiment. As shown in FIG. 5, the overmolded terminal block 10 includes an overmolded portion 20 and a plurality of electrical connectors 30, which are connected to a plurality of electrical wires 70 (not shown) which are gathered and extend from the terminal block 10. In accordance with one embodiment, the proximal end 58 of the terminal block 10 is tapered 14 such that the block 10 has a means to relieve strain to the block 10 during use and installation.

In accordance with one embodiment, the overmolded block 10 can be manufactured by placing the preformed substrate member 50 in a mold and injecting a dielectric material into the mold to form the overmolded portion 20. The mold is preferably a two-piece mold comprising a first section and a second section and having a cavity therein, which is configured to receive the portion of the prefabricated electrical connectors 30. The dielectric material is injected into the mold with a gravitational force of at least 1 g. Preferably, the dielectric material is injected into the mold by standard injection molding techniques to form the molded terminal block 10.

The dielectric material can be any type of dielectric polymer, conventional or otherwise depending on the desired dielectric properties of the material. In accordance with one preferred embodiment, the dielectric material is made from a material, which has been recycled. In addition, the dielectric material should have a desired viscosity for injection of the dielectric material into the mold. In accordance with one embodiment, the dielectric material is an insulator material, such as acrylonitrile butadiene styrene (ABS), polyolefin, polyurethanes, polyvinyl chloride, polystyrene, polycarbonates, polyesters, suitable plastics and desirable blends of the foregoing or other suitable materials. In one embodiment, the dielectric material is preferably is translucent to allow a telecommunications technician to trace the insulated electrical wires 70 including color coded twisted copper wire pairs 75.

Since the dielectric material can be any type of dielectric polymer, conventional or otherwise depending, the method and process as described herein allows for the use of dielectric materials that cannot be used with traditional potting compounds used in the hand poured gravity potting process. For example, the dielectric material can be selected from the group comprising acrylonitrile butadiene styrene (ABS), polyolefin, polyurethanes, polyvinyl chloride, polystyrene, polycarbonates, polyesters, suitable plastics and desirable blends of the foregoing or other suitable materials.

Preferably, the dielectric material and the composition of the electrical insulation (or outer jacket) 73 of the electrical wires are similar so that when the housing is molded it will chemically bond to the electrical insulation (or outer jacket) 73 increasing the integrity of the structure.

As set forth, the block 10 can be manufactured by a variety of overmolding methods including pressure molding techniques, e.g. injection, compression, or transfer molding. The term "pressure molding" is intended to mean placement of the dielectric material by applying a force to the material of greater than 1 g. (i.e., the force of gravity). Injection molding will be in many cases the preferred pressure molding method and equipment used. However, other methods and equipment can be adapted to provide the pressure molding of the dielectric material according to this invention, such as centrifugal casting. In operation, the force or pressure can be applied directly to the dielectric material or indirectly such as vacuum forming which can provide a pressure on the material up to 1 atmosphere.

When heating, the time required for curing the dielectric material will preferably be short, generally from about 10 to about 20 minutes, depending upon the particular curing agent used in the dielectric material. Those of ordinary skill in the art relating to free radical curing agents for polymeric dielectric materials are conversant with adjustments of cure times and temperatures required to effect optimum results with any specific free radical agent.

Figure 6:
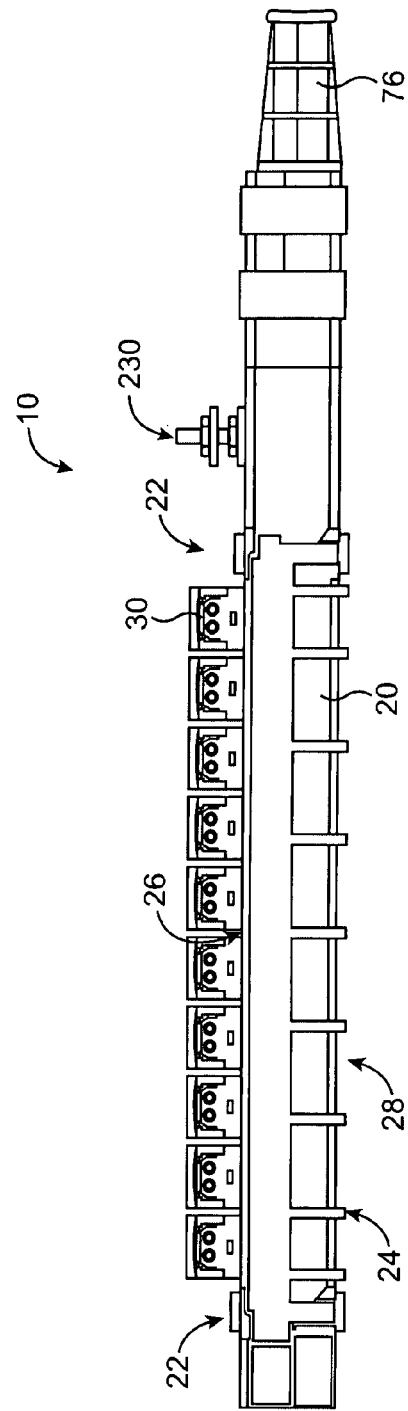
FIG. 6 is a side view of an overmolded terminal block in accordance with another embodiment.
Figure 7:
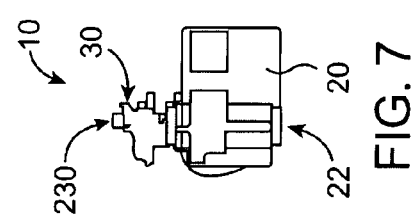
FIG. 7 is an end view of an overmolded terminal block in accordance with a further embodiment.

FIGS. 6 and 7 are a side and an end view of the overmolded terminal block 10, respectively. As shown in FIGS. 6 and 7, the terminal block 10 includes a plurality of electrical connectors 30, used in the telecommunications industry to connect multiple wire pairs, for example, to connect telephone service wires to telephone company distribution cables. The terminal blocks typically connect from 2 to 50 individual service wire pairs to the distribution cable that may have several thousand-wire pairs.

Figure 8:
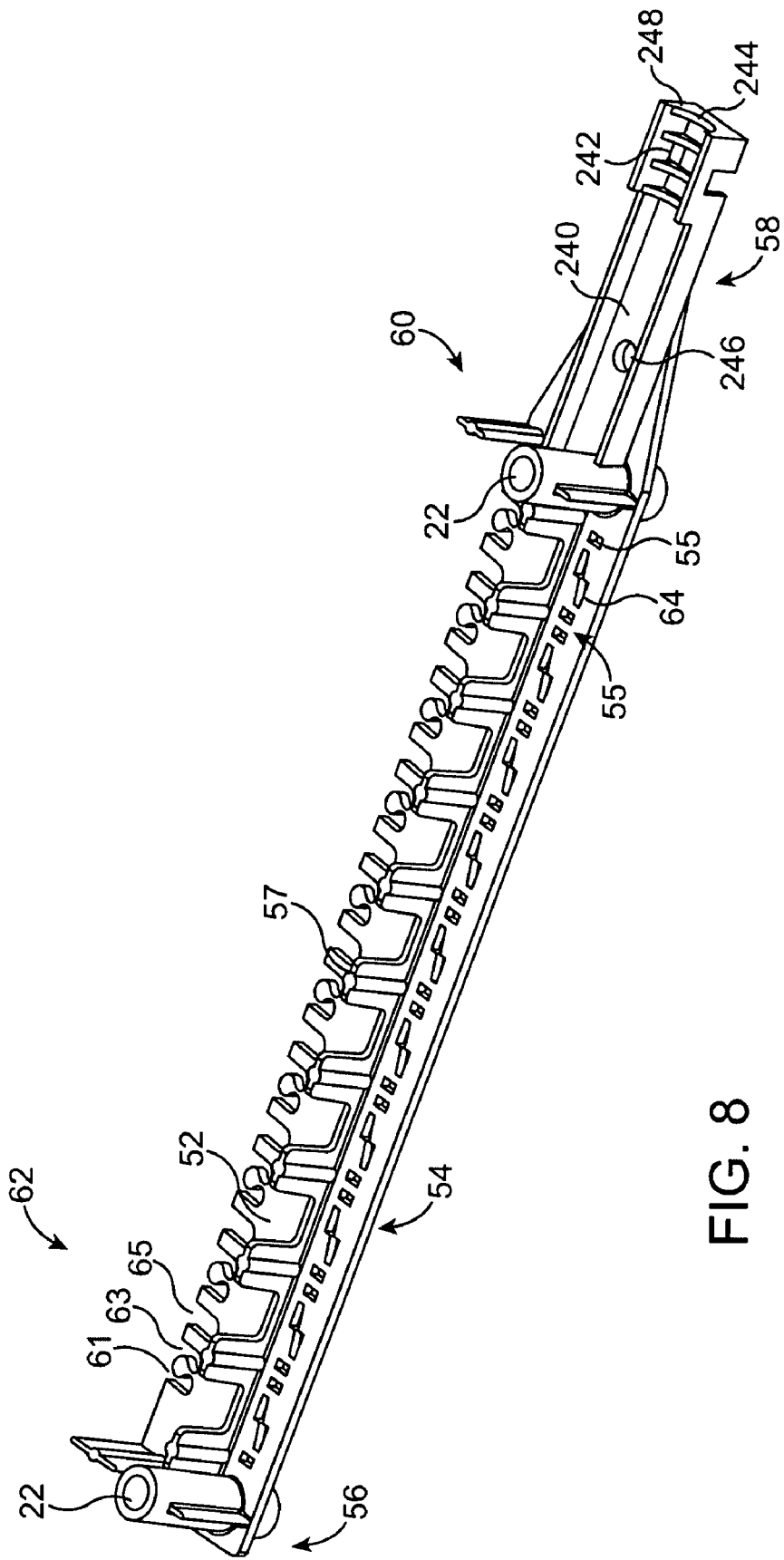
FIG. 8 is a perspective view of a podium member in accordance with another embodiment.

FIG. 8 is a perspective view of a podium member 60 in accordance with another embodiment. The podium member 60 is a generally elongated member having a distal end 56 and a proximal end 58. A pair of through holes or tubes 22 are positioned on the distal end 56 and the proximal end 58 of the podium member 60. The podium member 60 also includes a plurality of wire receiving slots (or grooves) 62 positioned on one of the outer edges 67 of the podium member 60 between the distal and proximal ends 56, 58, a center ridge 57, a plurality of electrical connector slots 64, and a plurality slot or openings 55 configured to receive a snap lock or protruding arm on each end of the electrical connector 30, such that the electrical connector 30 fits tightly within the podium member 60 during molding thereof.

As shown in FIG. 8, the outer edge 67 includes a plurality of wire receiving slots 62 generally having a jagged or saw tooth edge or other suitable configuration to assist with the wiring of the insulated electrical wires 70 to the electrical contact 32 on a first or exposed end 34 of the electrical connector 30. The plurality of wire receiving slots 62 are preferably arranged in groups of three comprised of a first 61 and a second 63 wire receiving slot, which are configured to receive one wire each of a pair of insulated electrical wires 70, which are attached to the electrical contact 32. A third wire receiving slot 65 is configured to receive the pair of electrical wires 70 from the first and second wire receiving slots 61, 63 and guide the pair of wires 70 towards the proximal end 58 of the podium member 60.

The plurality of electrical connector slots 64 are positioned within the podium member 60 and are configured to receive the exposed ends 34 of the electrical contact 32 having an insulation displacement contact (IDC) 36. The plurality of electrical connector slots 64 are preferably in pairs, which are configured to receive the pair of exposed ends 34 of the electrical connector 30. In accordance with one embodiment, the electrical connector slots 64 may be slightly offset to accommodate the exposed ends 34 of the electrical connector 30. In addition, to assist with the overmolding process, the podium member 60 can also include a plurality of holes or openings 55 positioned between the electrical connector slots 64 to help secure the electrical connectors 30 within the podium member 60. In accordance with one embodiment, the pair of exposed ends 34 having an insulation displacement contact (IDC) 36 receives a pair of insulated electrical wires 70, which are color codes for telecommunication use.

Figure 11A:
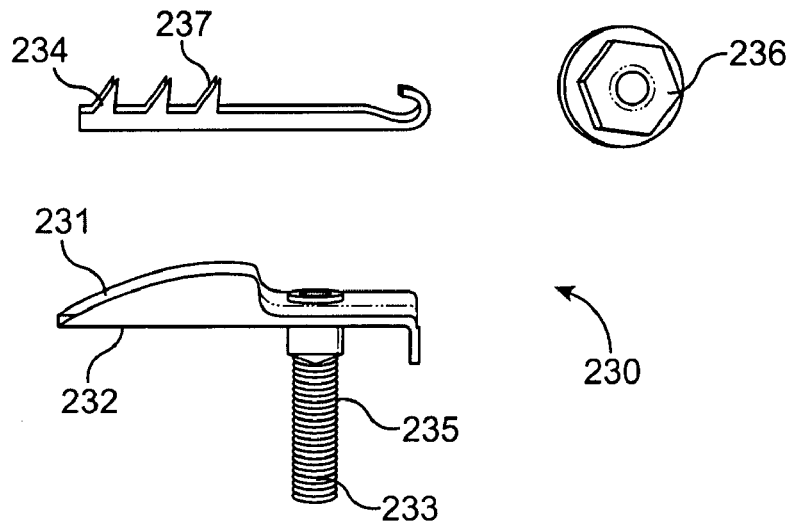
FIG. 11A is an exploded perspective view of a bond clamp in accordance with one embodiment.
Figure 11B:
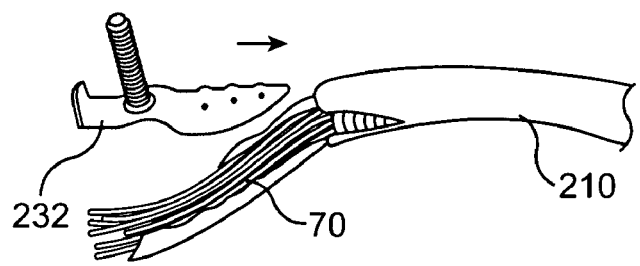
FIG. 11B is a perspective view of a lower plate of the bond clamp of FIG. 11A being inserted or attached to a cable.
Figure 11C:
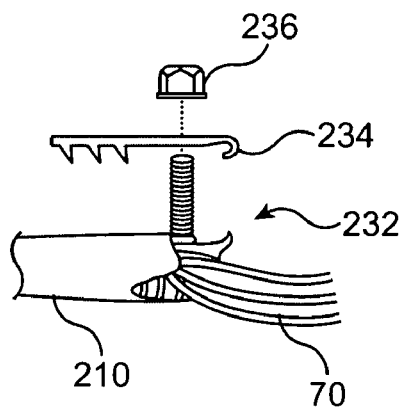
FIG. 11C is a perspective view of an upper plate of the bond clamp of FIG. 11A being attached to the lower plate.

The proximal end 58 of the podium member 60 can also include a base unit 240 configured to receive a cable 210 (FIG. 9), which is configured to receive a plurality of insulated electrical wires 70 (i.e., the pigtail). The base unit 240 can include a distal portion 241 and a proximal portion 242, the distal portion 241 having a cavity 245 with at least one guide hole 246 adapted to receive a bolt portion 233 of a bond clamp 230 (FIGS. 11A-11C). The proximal end 242 has a plurality of ribs 244, which is adapted to receive the cable 210. The plurality of ribs 244 are preferably round or other similar shape to match that of the cable 210.

Figure 9:
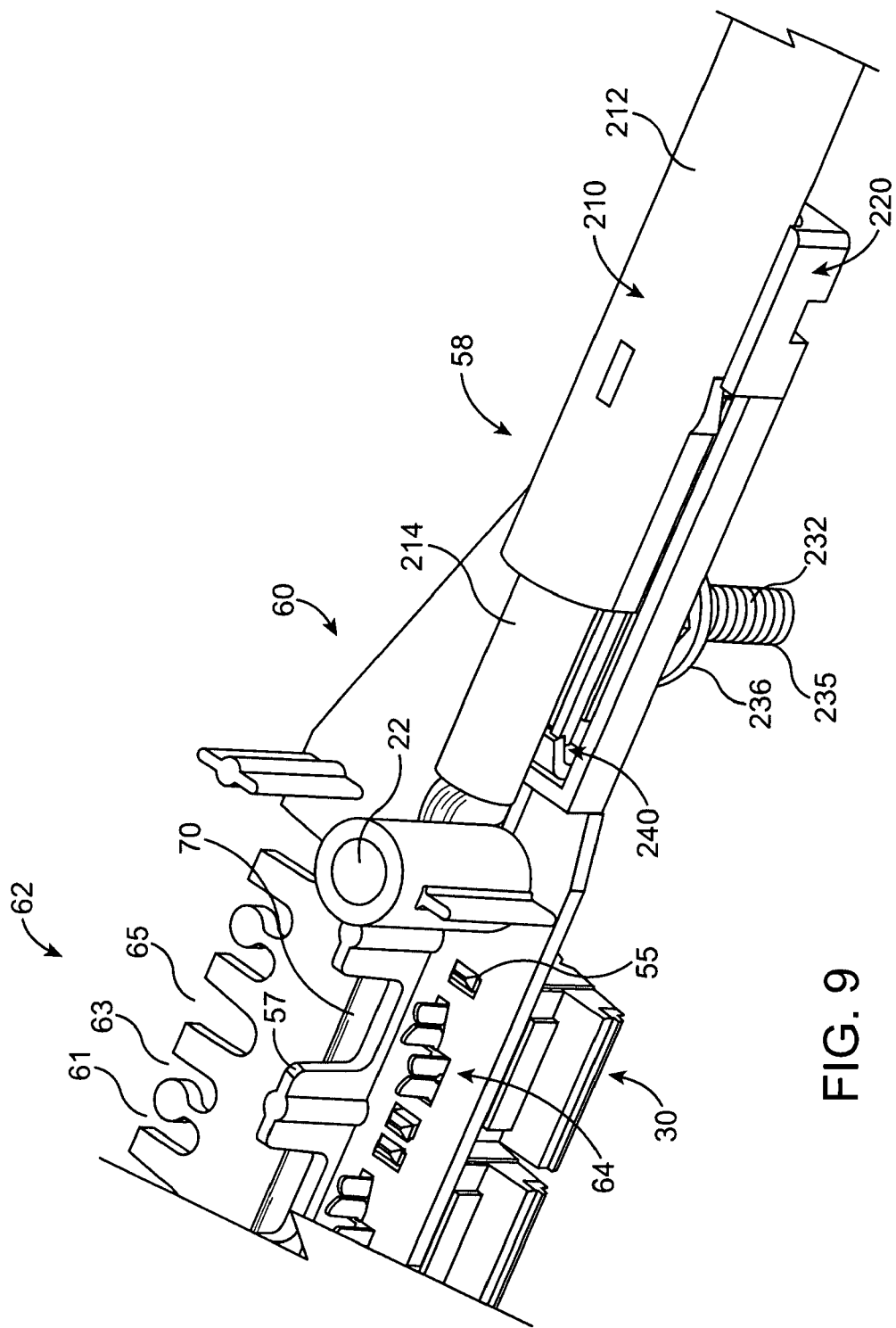
FIG. 9 is a perspective view of a podium member in accordance with a further embodiment.

FIG. 9 is a perspective view of a podium member 60 in accordance with a further embodiment, which is configured to receive a ground member or wire 200. The podium member 60 includes a plurality of wire receiving slots 62, a plurality of electrical connector slots 64, a plurality of holes or openings 55 configured to receive a foot 31 of the electrical connector 30, and a ridge member 57. The ridge member 57 provides a guide member for the plurality of insulated electrical wires 70 extending from the proximal end 56 to the distal end 58 of the podium member 60.

The cable 210 can be comprised of a plurality of insulated electrical wires 70, which are surrounded by a protective inner wrap 214, and a protective outer jacket 212. It can be appreciated that the insulated electrical wires 70 can also include a protective wrap around each pair of wires or any other combination of protection. The inner wrap 214 is preferably a polymeric material, such as Mylar®. The outer jacket 212 is preferably a suitable polymeric or otherwise protective material. In accordance with one embodiment, the cable 210 can be attached to the proximal end 58 of the podium member 60 with a bond clamp 230.

Figure 10:
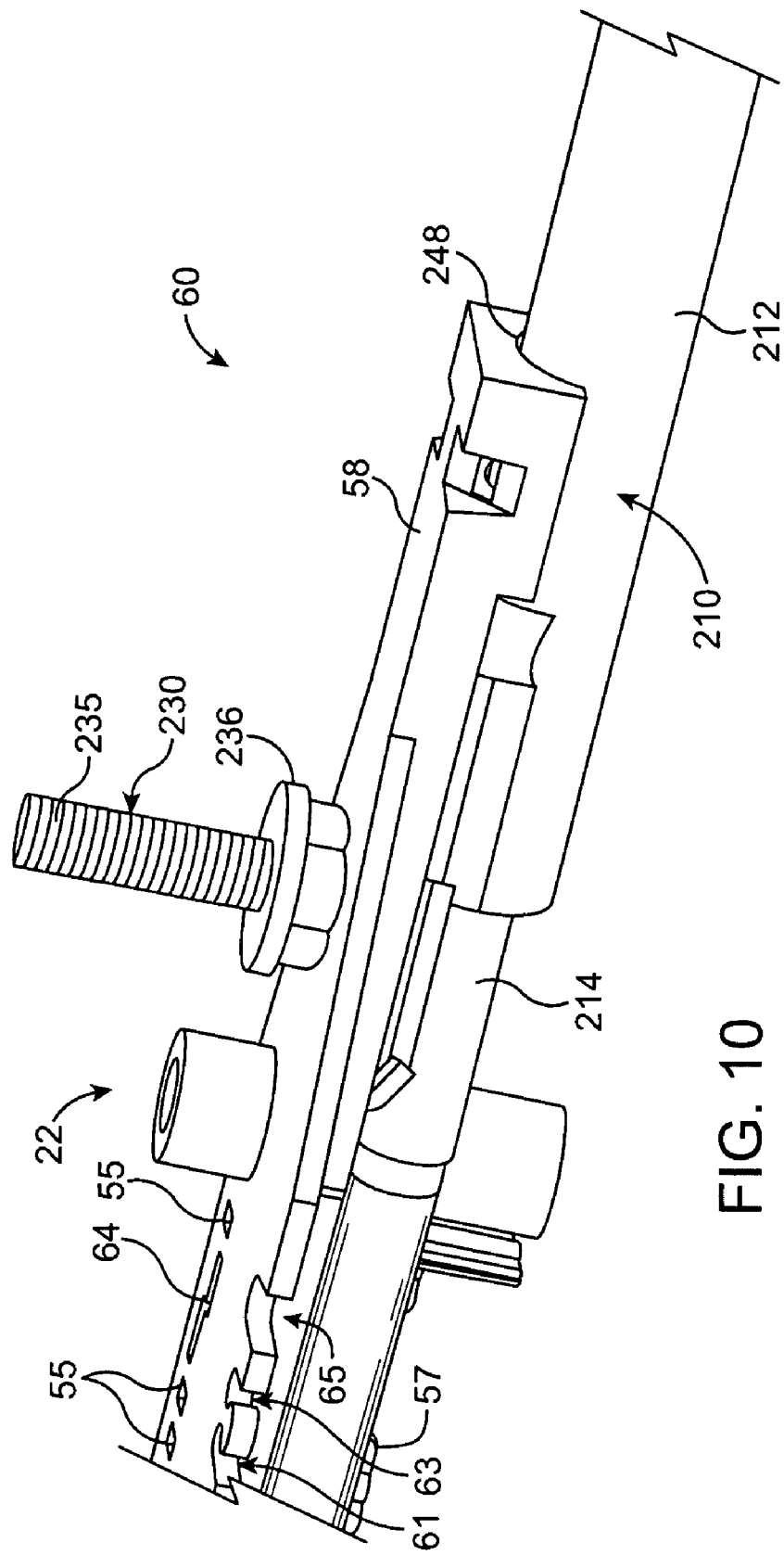
FIG. 10 is a perspective view of the podium member in accordance with another embodiment.

FIG. 10 is another perspective view of the podium member 60 as shown in FIG. 9. As shown in FIG. 10, the cable 210 fits within the cavity 245 of the base unit 240. The proximal end 242 has a plurality of ribs 244, which is adapted to receive the cable 210, which includes an inner wrap 214 and an outer jacket 212. The plurality of ribs 244 are preferably round or other similar shape to match that of the cable 210.

In accordance with another embodiment, a bond clamp 230 can be used to eliminate the need to include a wire or other device to prevent the plurality of insulated wires 70 from pulling out of or separating from the podium member 60 and the terminal block 10 itself. As shown in FIG. 11A, the bond clamp 230 includes a first or lower plate 232, a second or upper plate 234, and a fastener (or nut) 236. The first or lower plate 232 is comprised of a main body 231 having a rounded or concave end 239, which is configured to fit underneath the outer jacket 212 of the cable, and a stud or bolt 233 attached to the main body 231. The stud or bolt 233 is configured to extend through the opening 246 within the podium member 60. The second or upper plate 234 includes a plurality of protrusions or claw-like members 237, which are configured to a clamp onto an outer surface of the cable 210. The second or upper plate 234 also include a through hole (not shown), wherein the second or upper plate 234 slides onto the stud or bolt 233 of the first or lower plate 232. The first or lower plate 232 and the second or upper plate 234 can include an attachment system such as a hook or curved portion, which fits within a portion of the first or lower plate 232, such that upon tightening of the fastener 236 (i.e., nut) on the stud 233, the bond clamp 230 can be attached to one another before the bond clamp 230 is secured to the podium member 60. The bond clamp 230 is preferably made of aluminum. It can be appreciated the bond clamp 230 can be manufactured or made from any suitable material, which is preferably corrosion resistant and durable.

FIG. 11B is a perspective view of a lower plate of the bond clamp of FIG. 11A being inserted or attached to a cable 210. In accordance with one embodiment, the cable 210 is prepared by making a slit longitudinally through the outer jacket 212 of the cable 210 without cutting the inner wrap 214. As shown in FIG. 11B, the insulated electrical wires 70 and the inner wrap 214 can be moved back and forth to make room for insertion of the first or lower plate 232 between the inner wrap 214 and the outer jacket 212 of the cable 210. The first or lower plate 232 is then inserted between the inner wrap 214 and the outer jacket 212. The second or upper plate 234 is then placed over the stud 233 and secured with a fastener 236 (i.e., nut) as shown in FIG. 11C.

Figure 12:
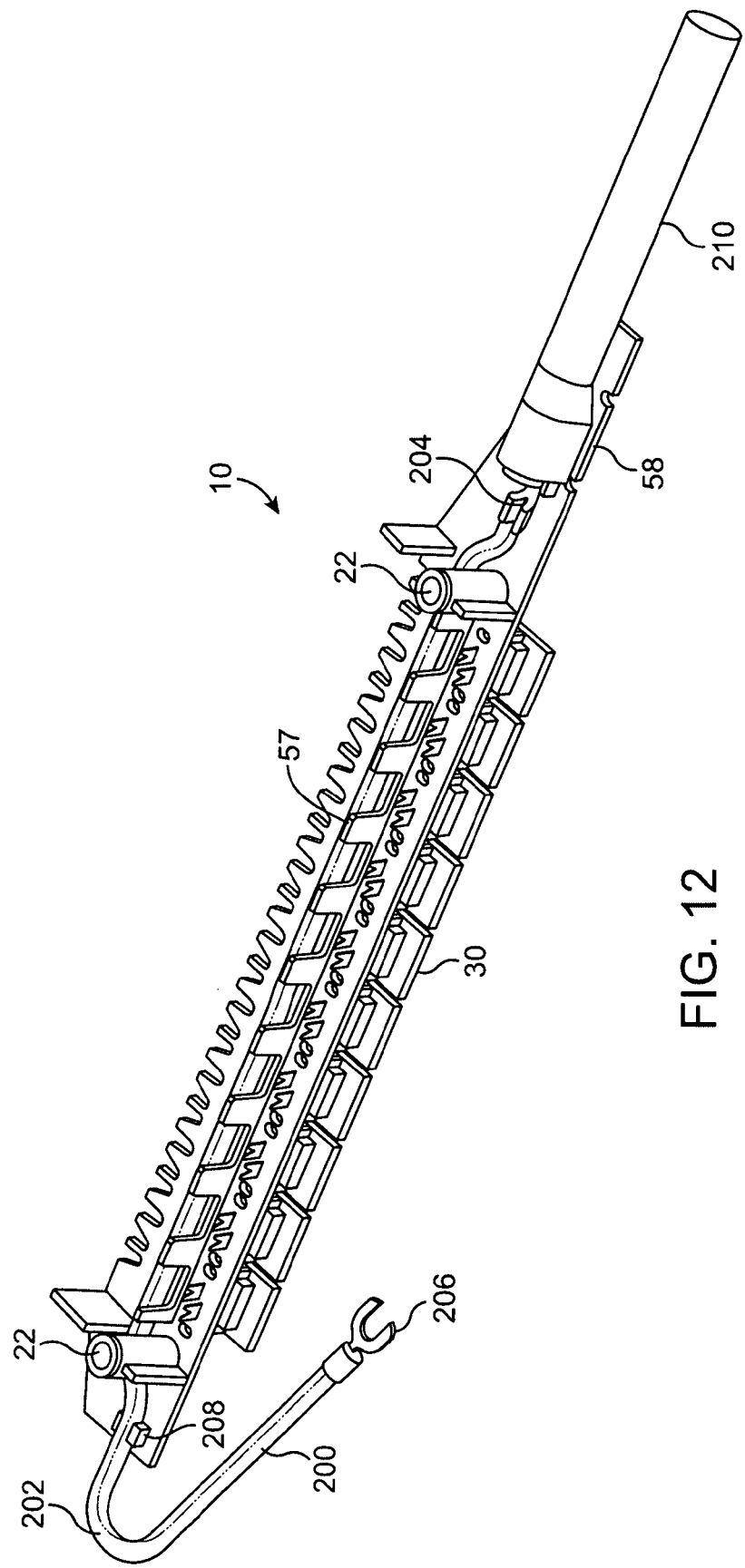
FIG. 12 is a perspective view of a podium member in accordance with another embodiment.

FIG. 12 shows another embodiment of a podium member 60 with a ground wire or member 200 attached thereto. As shown in FIG. 12, the podium member 60 includes a cable 210 (the plurality of individual electrical wires 70 are not shown) attached to the proximal end 58. The ground wire or member 200 extends from the proximal end 58 of the podium member 60 along the ridge 57 to the distal end 56 of the podium member 60. At the distal end 56 of the podium member 60, the podium member 60 can include a guide unit 208, which secures the ground wire or member 200 to the podium member 60 and directs the ground wire or member 200 though the podium member 60 before molding thereof. The ground wire or member 200 is preferably comprised of an electrical wire (not shown) having an insulated outer jacket of a polymeric or other suitable material 202. The proximal end 204 of the ground wire or member 200 is secured at the proximal end of the podium member 60 to the bond clamp or other suitable unit, and includes a distal end 206, which extends from the distal end of the podium member 60 and the molded terminal block 10.

Generally, the terminal block 10 is spliced to the distribution cable through a splicing cable or stub cable that forms part of the terminal block 10. The customer service wires are then connected to the terminal blocks 10 through some type of terminal, which, ideally, enables the service wires to be easily connected, disconnected and reconnected on site. As shown in FIG. 13, the terminal block 10 can also include a ground wire or member 200, which is configured to handle excess current or voltage. It can be appreciated that because of the overmolding process, the terminal block 10 will include a seam line 12, wherein an upper and a lower portion of the mold are joined. In addition, the terminal block 10 preferably includes a tapered end 14 as shown in FIG. 13, which provides strain relief for the terminal block 10 during use and/or installation of the terminal block 10. The taped end 14 also assists with securing the insulated electrical wire 70 and the electrical connectors 30 to the podium member 60 during overmolding of the terminal block 10.

FIG. 14 is a perspective view of an overmolded terminal block 10 and a bracket mounted terminal (BMT) 300 in accordance with another embodiment. As shown in FIG. 14, the terminal block 10 can be mounted to a bracket mounted terminal 300, which includes a ground plate 310. The ground wire or member 200 attaches to the ground plate 310 to provide protection to the system. The bracket mounted terminal 300 can also include a lockable sealing clamp 320 and a stainless steel bracket 330 to assist with the positioning of the terminal block 10. An airtight and watertight housing or dome enclosure (not shown) is typically placed over the terminal block 10 to provide an airtight and watertight housing for the terminal block 10. The watertight housing or dome enclosure is preferably a high impact, UV resistant thermoplastic material, which is resistant to corrosive environments and can be used for buried, underground, marina and aerial applications.

The electrical connector 30 preferably has a pair of wire receiving passages 84 movable between a first position in which a pair of wires 70 (not shown) is held apart from the second end of the electrical contact 30, and a second position in which the pair of wires 70 is inserted into the second end of the electrical contact. As shown in FIG. 15A, the electrical connector 30 includes a body member 80 and a receptacle 82. The receptacle 82 includes the pair of wire receiving passages 84. In accordance with one embodiment, the wire receiving passages 84 are movable between the first position in which the wires are held apart from the second end and the second position in which the wires are inserted into the second end. The receptacle 82 can include a handle 86 adapted to move the wire receiving passages 84 to either the first or the second position. The connector 30 is capable of removing the pair of wires from the second end and reinserting the pair of wires into the second end. Each of the connectors 30 include a pair of feet 31, which can be placed within the openings 55 on the podium member 60 during assembly of the pre-molded assembly 50.

The second end of the multiple electrical connectors incorporating the connector 30 preferably comprises insulation displacement contacts, positioned such that movement of the receptacle 82 to the second position causes an inserted wire to be engaged by the IDC connector. In addition, movement of the receptacle 82 back to the first position disengages the wire from the IDC connector.

In operation, a pair of wires is inserted into the wire receiving passages 84 in the first position where the wires are held apart from the second end. The technician grasps the handle 86 of the receptacle 82 and pushes the handle forward causing the wire receiving passages 84 and receptacle 82 to move to the second position. In the second position, the IDC connector engages the pair of wires. If the technician desires to remove the pair of wires from engagement with the IDC connector, the handle 86 of the receptacle 82 is pushed downward releasing the ends of the wires from engagement with the IDC connector. The pair of wires is then removed from the wire receiving passages 84. If re-entry is desired, the ends of the wire are preferably cut at a distance of about 10 mm and the wires are then re-inserted into the wire receiving passages 84. Alternatively, a second pair of wire can be re-inserted into the wire receiving passages 84 and pushing forward the handle 86 to engage the second pair of wires with the IDC connector.

In addition, the connector 30 can include a test port 83 configured to receive a test clip 85 as shown in FIG. 15B. The test clip 85 allows the technician to test the terminal block 10 for electrical signals from the central office ("C.O.") and for service to the customer. If the technician wants to test only the central office line, the connector 30 is placed in the first position in which the wires are held apart from the second end and the test clip 85 is inserted into the test port 83. Alternatively, if the technician wants to test both the central office line and the outgoing service line to the customer, the connector 30 can be placed in the second position in which the wire are engaged with the IDC connector and the test clip 85 inserted into the test port 83.

It can be appreciated that the connector 30 of the terminal block 10 can be entered substantially more than five times, preferably more than ten times and most preferably more than fifty times without loss of the weather resistance of the terminal block 10. Thus, in the preferred embodiments of the invention, the terminal block 10 alone, or when connected to a module, is weatherproof as defined by the majority, if not all, of the preceding weather related tests for use in harsh outside or buried environments. The connector 30 is preferably configured to accept wires having a gauge of about 26 AWG to about 18½ AWG (about 0.4 to 0.9 mm). The outer diameter of the wires including insulation can be up to about 2.06 mm for standard telephone wires.

However, it can be appreciated that the electrical connector 30 can be designed to accommodate wires having other gauges including Category 3, 5, and 6 broadband wires. In addition, the terminal block 10 can be designed to accommodate wires of different gauges. Typical telecommunication wires are constructed of a soft copper insulated in an outer jacket of polyvinyl chloride.

In operation, the insulation displacement contact (IDC) pierces the insulation of the insulated wire 70, which removes the insulation (or outer jacket) 73 from the copper or electrical wire 71 and makes electrical contact with the electrical wires. In one embodiment, the terminal block 10 has an insulation displacement contact (IDC) terminal at each end are inserted into the bore holes of the mold by a robotic device. Although any suitable IDC contact may be used, the IDC contacts preferably are capable of terminating a 19-26 AWG gauge wire, and more preferably a 22-24 AWG gauge wire. It can be appreciated that the electrical connectors 30 can be any suitable electrical connector comprising a pair of termination points.

In accordance with one embodiment, the preformed substrate member 50 comprised of the podium member 60, which includes at least one electrical connector 30 and a pair of insulated electrical wires 70 attached to each pair of electrical contacts 32 positioned within the electrical connector 30 is placed in a mold and a dielectric material is injected to the mold, which provides environmental and mechanical protection for the electrical connectors and the multiple pairs of electrical wires. It should be appreciated by those skilled in the art that although the electrical connectors 30 are shown as insulation displacement contacts, however any type of electrical connector or contact could be used with this method.

The terminal block 10 can be manufactured by a process, wherein the dielectric material is injected into a mold by a gravitational force of greater than 1 g. As set forth, the traditional methods and processes for manufacturing terminal block in the telecommunications industry require potting of the electrical connectors and the electrical wires by potting or pouring a potting compound over the electrical connectors and electrical wires at a gravitation force equal to 1 g.

It can be appreciated that the multiple electrical wires 70 preferably have a color-coded insulated jacket, which is fed from a spool of electrical wires to a collection slot. The collection slot directs the multiple pairs of electrical wires to the mold, wherein a first robotic device connects the multiple pairs of electrical wires 70 to the electrical connectors 30. Prior to connecting the multiple pairs of electrical wires to the electrical connectors 30, the electrical connectors 30 are positioned in the podium member 60 by a second robotic device. It can be appreciated that a single robotic device can be used to position the electrical connectors in the podium member 60 and to connect the multiple pairs of electrical wires 70 to the electrical connectors 30.

In operation, the electrical insulation or outer jacket 73 of the multiple pair of electrical wires 70 preferably has physical properties such that the electrical insulation has a higher melting temperature than the dielectric material. Since the dielectric material can be any type of dielectric polymer, conventional or otherwise depending, the method and process as described herein allows for the use of dielectric materials that cannot be used with traditional potting compounds used in the hand poured gravity potting process. It can be appreciated that a robotic device can be used to cut the multiple insulated electrical wires and gather the multiple insulated electrical wires to form a cable.

While this invention has been described with reference to the preferred embodiment described above, it will be appreciated that the configuration of this invention can be varied and that the scope of this invention is defined by the following claims.

What is claimed is:

1. A method of manufacturing a terminal block for a telecommunication cable comprising:
   providing a preformed substrate member comprising:
      an elongated podium member having a distal end, a proximal end, a front side, a back side, a plurality of wire receiving slots on an outer edge of the podium member and a plurality of electrical connector slots positioned within the podium member, wherein the plurality of wire receiving slots are arranged in groups of three comprised of a first and a second wire receiving slot, which are configured to receive one wire each of a pair of insulated electrical wires, which are each attached to an electrical contact, and a third wire receiving slot configured to receive the pair of insulated electrical wires from the first and second wire receiving slots and guide the pair of insulated electrical wires towards the proximal end of the podium member;
      an electrical connector positioned within each of the plurality of electrical connector slots, and wherein each electrical connector has a pair of electrical contacts extending therefrom; and
      at least one insulated electrical wire attached to each of the electrical contacts;
   placing the preformed substrate member in a mold; and
   injecting a dielectric material into the mold containing the podium member to form an overmolded terminal block, wherein the dielectric material covers the at least one insulated electrical wire and a portion of the electrical contact positioned within the electrical connector.

2. The method of claim 1, further comprising attaching a bond clamp to the at least one insulated electrical wire.

3. The method of claim 2, further comprising attaching the bond clamp to the podium member.

4. The method of claim 1, wherein the mold includes a cavity configured to receive a portion of the electrical connector, which does not receive overmolding.

5. The method of claim 1, wherein the electrical connector is a multi-use connector.

6. The method of claim 1, wherein each of the plurality of electrical connectors has a first end and a second end and which are adapted to receive the pair of insulated electrical wires at the first end on the back side of the substrate member and to receive electrical conductors on the front side of the substrate member.

7. The method of claim 6, wherein the first end of the electrical connector comprises an insulation displacement contact terminal.

8. The method of claim 6, wherein the second end of the electrical connector comprises an insulation displacement contact terminal.

9. The method of claim 1, further comprising gathering a plurality of insulated electrical wires in a bundle to form a cable, wherein the insulated electrical wire comprises an electrical wire surrounded by an insulated outer jacket and cutting the insulated electrical wire at a second end to form a bundle of wires.

10. The method of claim 9, further comprising multiple pairs of electrical wires extending from the cable, wherein the electrical wires are connected to the electrical connectors on the back side of the substrate member.

11. The method of claim 1, wherein the dielectric material is selected from the group comprising acrylonitrile butadiene styrene (ABS), polyolefin, polyurethanes, polyvinyl chloride, polystyrene, polycarbonates, polyesters, suitable plastics and desirable blends of the foregoing or other suitable materials.

12. The method of claim 1, wherein the dielectric material is injected by applying a force to the dielectric material of greater than 1 g.

13. The method of claim 1, wherein the insulated electrical wires are comprised of a plurality of color-coded outer jackets adapted to identify pairs of electrical wires.

14. The method of claim 1, further comprising removing an outer jacket of insulation from the insulated electrical wires to expose an individual wire contained therein before connecting the insulated electrical wires to the electrical connectors, and wherein the step of removing the outer jacket of insulation to expose the individual wire contained therein is performed by an insulation displacement contact terminal.

15. The method of claim 1, wherein the insulated electrical wires comprise soft copper wires having a gauge of about 19 AWG to about 26 AWG, and wherein the insulated electrical wires are color-coded and have an outer jacket of polyvinyl chloride.

16. The method of claim 1, wherein each of the electrical connectors comprise a pair of wire receiving passages movable between a first position in which a pair of wires are held apart from electrical contact and a second position in which the pair of wires are inserted into the electrical contact, wherein the connector is capable of removing the pair of wires from the electrical contact and reinserting the pair of wires into the electrical contact.

17. The method of claim 1, wherein the wiring of the podium member starts at the distal end and works towards the proximal end of the podium member.

18. The method of claim 17, further comprising a plurality of pairs of insulated electrical wires, which form a cable.

* * * * *